(12) United States Patent
Schmitt

(10) Patent No.: US 9,808,746 B2
(45) Date of Patent: Nov. 7, 2017

(54) FILTER DEVICE

(75) Inventor: Ralf Schmitt, Tholey (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 817 days.

(21) Appl. No.: 13/261,643

(22) PCT Filed: Oct. 17, 2011

(86) PCT No.: PCT/EP2011/005191
§ 371 (c)(1),
(2), (4) Date: May 10, 2013

(87) PCT Pub. No.: WO2012/052139
PCT Pub. Date: Apr. 26, 2012

(65) Prior Publication Data
US 2013/0233783 A1    Sep. 12, 2013

(30) Foreign Application Priority Data

Oct. 18, 2010   (DE) .................. 10 2010 049 975

(51) Int. Cl.
*B01D 29/88* (2006.01)
*B01D 29/23* (2006.01)
*B01D 35/153* (2006.01)

(52) U.S. Cl.
CPC ............. *B01D 29/88* (2013.01); *B01D 29/23* (2013.01); *B01D 35/153* (2013.01)

(58) Field of Classification Search
CPC ........ B01D 29/23; B01D 29/70; B01D 29/88; B01D 29/90; B01D 29/96; B01D 35/027;
(Continued)

(56) References Cited

U.S. PATENT DOCUMENTS

| 7,435,347 B2* | 10/2008 | Klein ................ B01D 35/143 |
| | | 137/512.15 |
| 2006/0219626 A1 | 10/2006 | Dworatzek et al. |
| 2013/0228507 A1* | 9/2013 | Schmitt et al. ............... 210/435 |

FOREIGN PATENT DOCUMENTS

DE    10 2005 001 828 A1    7/2006
DE    20 2005 012435 U1    12/2006
(Continued)

OTHER PUBLICATIONS

DE102009007389B3—EPO Machine Translation (Description), 2015, 12 pages.*

(Continued)

*Primary Examiner* — Patrick Orme
(74) *Attorney, Agent, or Firm* — Wenderoth, Lind & Ponack, L.L.P.

(57) ABSTRACT

A filter device has a filter element (37) in a filter housing having a connection unit (29) forming a fluid connection to the filter element (37). The connection unit (29) feeds fluid to be purified to the dirty side (41) of the filter element (37) and is a component of the element receiver mounting the filter element (37) in the functioning position. The connection unit (29) is a component of the filter housing. The valve arrangement (61; 67, 69) is movable such that by removing the filter element (37) from the filter housing, the valve arrangement (61; 67, 69) closes and by insertion of the filter element (37) into the filter housing, the valve arrangement (61; 67, 69) opens.

18 Claims, 2 Drawing Sheets

(58) Field of Classification Search
CPC .. B01D 35/0276; B01D 35/153; B01D 35/30; B01D 35/306; B01D 2201/16; B01D 2201/167; B01D 2201/291; B01D 2201/301; B01D 2201/302; B01D 2201/304; B01D 2201/307
See application file for complete search history.

(56) References Cited

FOREIGN PATENT DOCUMENTS

| | | | |
|---|---|---|---|
| DE | 202005012435 U1 * | 1/2007 | ........... B01D 35/153 |
| DE | 10 2007 056 362 A1 | 5/2009 | |
| DE | 10 2009 007389 B3 | 4/2010 | |
| DE | 102009007389 B3 * | 4/2010 | ............. B01D 29/21 |

OTHER PUBLICATIONS

DE202005012435—EPO Machine Translation (Description), 2015, 3 pages.*
DE102009007389—USPTO Human Translation (2015), 31 pages.*
DE202005012435—USPTO Human Translation (2015), 16 pages.*

* cited by examiner

FILTER DEVICE

FIELD OF THE INVENTION

The invention relates to a filter device having at least one filter element that can be accommodated in a filter housing. The filter housing has at least one connection unit for forming a fluid connection to the filter element. The connection unit is intended to supply the fluid to be cleaned to the dirty side of the filter element and is a component of the element receiver. The filter element in the operating position interacts with the element receiver.

BACKGROUND OF THE INVENTION

Filter devices of this type are readily available on the market in a plurality of constructions and versions. Such filter devices are used mainly to filter out fouling in fluids, such as hydraulic. Fouling of the hydraulic oil occurs in the installation or at the start-up of the respective hydraulic system. In addition to this initial fouling, fouling can occur during operation, for example, by penetration of dirt at the hydraulic tank as a result of inadequate tank ventilation, pipe penetrations, piston rod seals, and the like. Fouling can occur within the fluid stored in the hydraulic tank, especially in the hydraulic systems of heavy machinery such as earth moving machines, excavators, or the like. Furthermore, in these types of applications of the filter device, effecting filtration directly in the region of the hydraulic tank, for example, by installing the filter device directly in the tank, can be useful.

DE 10 7007 056 362 A1 discloses a filter device, especially in the form of a return intake filter, having at least one filter housing in which at least one filter element defines one longitudinal axis and can be accommodated. At least two valve units, especially in the form of a bypass valve and a back pressure valve, are located in an arrangement concentric to and along the longitudinal axis of the respective filter.

DE 10 2006 011 844 B4 discloses a filter element with a filter bowl that borders an interior, with a bottom part having a flow passage, with a filter medium located in the interior of the filter bowl, and with a valve body of a valve apparatus. The valve body can be actuated by the fluid pressure on the fluid passage of the bottom part, and has a screen-like, flexible closing jacket. In the opened-up state, the closing jacket blocks the fluid passage, is moved by the fluid pressure in the direction to its closed position, and clears the fluid passage.

In these two aforementioned filter solutions, the respective valve arrangements for the filter element installed in the filter housing are actuated accordingly in their respectively provided operating position and by the respectively prevailing fluid pressure, especially of the fluid to be filtered. Under the conditions of use prevailing in the operation of the filter device in construction machinery or other machinery operated in the open, due to the higher fouling rates that arise, frequent changing of the filter element must be done. In the course of handling the used, i.e., fouled, filter elements, in these known solutions, the risk exists that contamination both of the system, i.e., especially of the filter housing and the tank, and also of the environment, will occur.

DE 10 2005 001 828 A1 discloses a fitting forming a fluid-conducting connection to a plastic tank, in particular a tank for accommodating a fluid, specifically a hydraulic fluid. The tank has a connection part in the form of a hollow body with a jacket that extends along one longitudinal axis of the hollow body between its ends. The hollow body is embedded in the plastic of the wall of the tank such that one open end of the hollow body on the edge of an opening of the tank and at least one partial region of the jacket of the hollow body are surrounded by the plastic of the wall of the tank. A filter element can be reliably integrated in a tank by this fitting. However, in a replacement of the used filter element by a new element in turn it cannot be precluded that the above-described fouling problems will occur.

SUMMARY OF THE INVENTION

An object of the invention is to provide an improved filter device in which the risk of fouling is largely precluded when used filter elements are replaced.

This object is basically achieved according to the invention by a filter device having a valve arrangement in the filter element being movable by the connection unit as a component of the filter housing or of the parts assigned to the filter housing. When the filter device is shut off by removing the filter element from the filter housing, the valve arrangement moves into its closed position. When the filter device is started up by inserting the filter element into its operating position within the filter housing, the valve arrangement moves into its opened position. This arrangement eliminates the risk that when the filter element is being replaced, fouling attached and/or deposited on the used filter element on the dirty side when the used filter element is withdrawn from the element receiver, can fall off the filter element and can travel to the clean side. Therefore, no subsequent operations need be carried out to clean the filter housing in conjunction with changing the filter element.

Preferably, in the relative motion of the filter element and filter housing toward one another for start-up of the filter device, the opening of the valve arrangement by the connection unit from the closed position into the open position takes place in succession.

To form the valve arrangement, the end of an inlet fitting can be spanned by a cap of elastomer material that is provided with notches such that the connection fitting of the connection unit, which fitting penetrates the inlet fitting in the operating position, opens the notches of the cap to form flow slots by mechanical action on the cap. This construction of the valve arrangement can be easily produced especially economically so that the presence of the valve arrangement on the filter element increases its production costs only slightly.

Alternatively, the valve arrangement on the inlet fitting can have a movable valve body pretensioned by mechanical closing force into the closed position that blocks the inlet fitting. When the filter element is attached to the element receiver, it can be moved out of the closed position by the mechanical action of the connection fitting against the closing force. Advantageously, in this valve design, likewise as in the use of an elastomer valve cap, no mechanical effort on the part of the connection unit is necessary for valve actuation, because in both cases the valve opening takes place by mechanical action by the connection fitting of the connection unit that in the operating position of the filter element penetrates its inlet fitting.

In especially advantageous exemplary embodiments, the filter housing is formed by a filter bowl molded integrally into a tank. On the bowl bottom, the connection unit of the element receiver is located. Especially advantageously, this arrangement eliminates a separate filter housing to be installed in the tank because the filter bowl itself as an integral component of the tank forms the filter housing.

Especially advantageously, the filter element, through which flow can take place from its inner filter cavity to the outside of its filter medium during filtration, is provided with at least one end cap. This end cap, that is the lower one in the operating position of the filter element, interacts with the element receiver having the inlet fitting projecting into the filter cavity, attached to the valve arrangement and engaging the connection fitting of the connection unit as a component of the element receiver with sealing in the operating position.

In especially advantageous exemplary embodiments, on the bottom of the filter bowl, a connection piece is molded and joined to a bottom-side wall section of the tank. This wall section forms a passage for the connection fitting, and through which the connection fitting extends from the outside of the tank into the filter bowl.

Especially advantageously, the wall section of the tank adjoining the connection piece is located in a local indentation extending upward from the base of the tank. This arrangement permits a "countersink" on the bottom-side connection completely into the bottom of the tank. As a result, advantages arise for the installation of the tank in heavy machinery with little available installation space.

Preferably, the connection fitting in the connecting piece is fixed by a screw union that can be a standard screw-in design.

The tank, together with the filter bowl that forms an integrated component of it, can be especially advantageously molded out of plastic.

Furthermore, the filter bowl that is open on the top of the tank can be advantageously closed by a plastic cover screwed to an internal thread located on the edge region of the filter bowl. The cover with its outside then forms a part of the upper tank wall. In these exemplary embodiments, the tank can be configured such that in a fluid connection proceeding from the tank bottom, the tank with one wall part forms an outer skin part of the pertinent machinery, and only the cover of the filter bowl on the outer skin is visible on the entire filter device.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
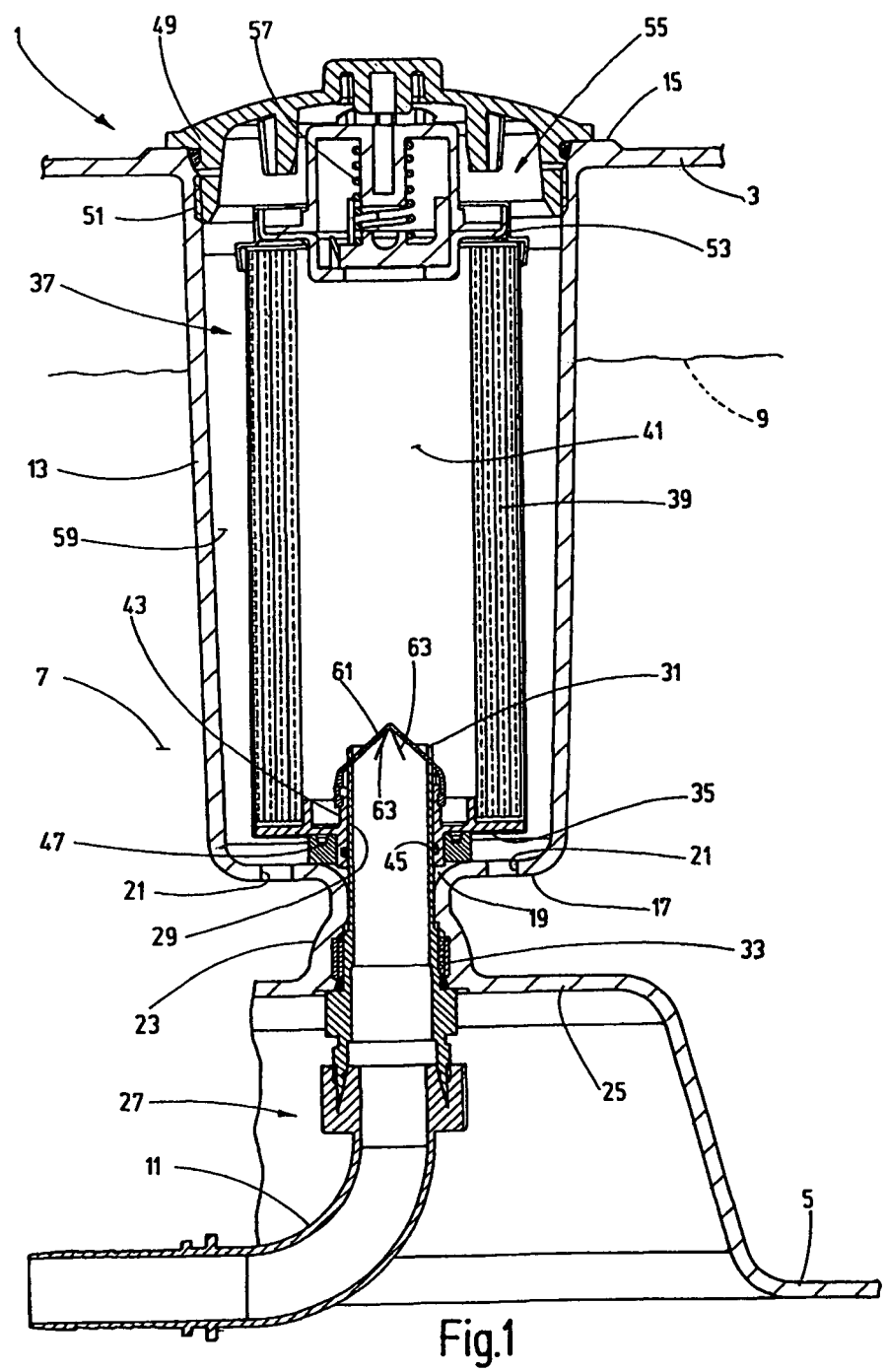
FIG. 1 is a side elevational view in section of a fluid tank with a filter device according to a first exemplary embodiment of the invention.

The fluid tank 1, designed to accommodate a supply of hydraulic fluid, is shown in the drawings only by an upper wall section 3 and a lower wall section 5. Together with other wall parts that are not shown, wall sections 3, 5 delineate an interior 7 for hydraulic fluid at a level 9. Tank 1 is a component of a hydraulic system of a heavy machine, for example, in the form of a small excavator. Of the hydraulic system, only one tank return line 11 is shown via which hydraulic fluid to be cleaned is supplied to the filter device and, after completed cleaning, is returned by it to the interior 7 of the tank 1.

Tank 1 is made out of plastic material compatible with hydraulic fluid in a rotary molding method. A filter bowl 13 molded integrally to the tank walls extends inward. The bowl 13 is open on the top 15 of the tank and extends vertically from the top 15 of the tank into the vicinity of the base of the tank 1, relative to the installation position of the tank 1. The bowl bottom 17 has a centrally located connection opening 19 and outflow openings 21 located laterally from opening 19 via which cleaned fluid travels out of the filter bowl 13 into the interior 7 of the tank 1. The connection opening 19 on the bowl bottom 17 is connected to a connecting piece 23 via which the bowl bottom 17 is connected to the lower wall section 5 of the tank 1. As the drawings show, a port connection 27 of the return line 11 on the filter device is placed within an indentation 25 arched upward from the base of the tank 1 so that the connection fitting is "countersunk" within the tank bottom.

From the port connection 27 of the return line 11, a connection fitting 29 extends in the form of a cylindrical hollow body that is stepped on its outside through the connecting piece 23 and the bottom opening 19 of the bowl 13 into its interior. The end 31 of the connection fitting 29 is located at a distance from the bowl bottom 17. The connection fitting 29 is fixed in the connecting piece 23 by a threaded insert 33 and forms a component of an element receiver that interacts with the lower end cap 35 of a filter element 37 to fix the filter element 37 within the filter bowl 13 in its operating position. The filter bowl 13 acts as a filter housing.

The filter element 37, shown in its operating position in the drawing, on its lower end cap 35 conventionally forms an enclosure for a filter medium 39 in the form of a hollow cylinder surrounds an inner filter cavity 41 and has a central inlet fitting 43 that can be slipped onto the connection fitting 29 in the operating position. A sealing element 45 on the inlet fitting 43 seals relative to the connection fitting 29. The element receiver completes a spacer ring 47 of elastomer material surrounding the inlet fitting 43 and defining the axial positioning between the end cap 35 and the bowl bottom 17.

The filter bowl 13 is open on the top 15 of the tank and can be closed by a plastic cover 49 screwed to an internal thread 51 located on the edge region of the filter bowl 13. The cover 49 is visible only with its outside on the top 15 of the tank. A bypass valve 55 is located between the cover 49 and the upper end cap 53 of the filter element 37. With a correspondingly prevailing differential pressure, bypass valve 55 conventionally clears a fluid connection between the inner filter cavity 41 and the outside of the filter element 37. Closing spring 57 keeps the bypass valve 55 in the closed, normal operating position.

During filtration, the hydraulic fluid flowing into the filter cavity 41, via the connection fitting 29, flows through the filter medium 39 from the inside to the outside. The cleaned fluid from the space of the filter bowl 13 surrounding the filter medium 39 and forming the clean side 59 flows back into the interior 7 of the tank 1 via the outflow openings 21. In the exemplary embodiment of FIG. 1, on the free end region of the inlet fitting 43 projecting into the filter cavity 41, a valve arrangement is formed from a valve cap 61 of elastomer material and traverses the end of the inlet fitting 43. This cap 61 has several notches 63. Without mechanical action applied to the valve cap 61, the valve cap 61 with the notches 63 closed forms a closure of the inlet fitting 43. If, however, the filter element 37, as is shown in FIG. 1, is moved into the operating position and is slipped onto the connection fitting 29, with the inlet fitting 43, the valve cap 61 is opened up by mechanical action of the free end 31 of the connection fitting 29 in the manner shown in FIG. 1. As a result, the notches 63 are widened into flow slots, so that fluid flows into the filter cavity 41 through the connection fitting 29 for the filtration process. If the filter element 37 is withdrawn from the connection fitting 29 for element replacement, the valve cap 61 returns into the unwidened position in which the cap 61 with the notches 63 closed closes the end of the inlet fitting 43. This process prevents fouling located in the filter cavity 41, i.e., the dirty side, from falling out of the filter element 37, and fouling the clean side when the filter element is being replaced. In the handling of the used filter element 37 that has been removed from the filter bowl 13, this structure reduces the risk of fouling of the environment.

Figure 2:
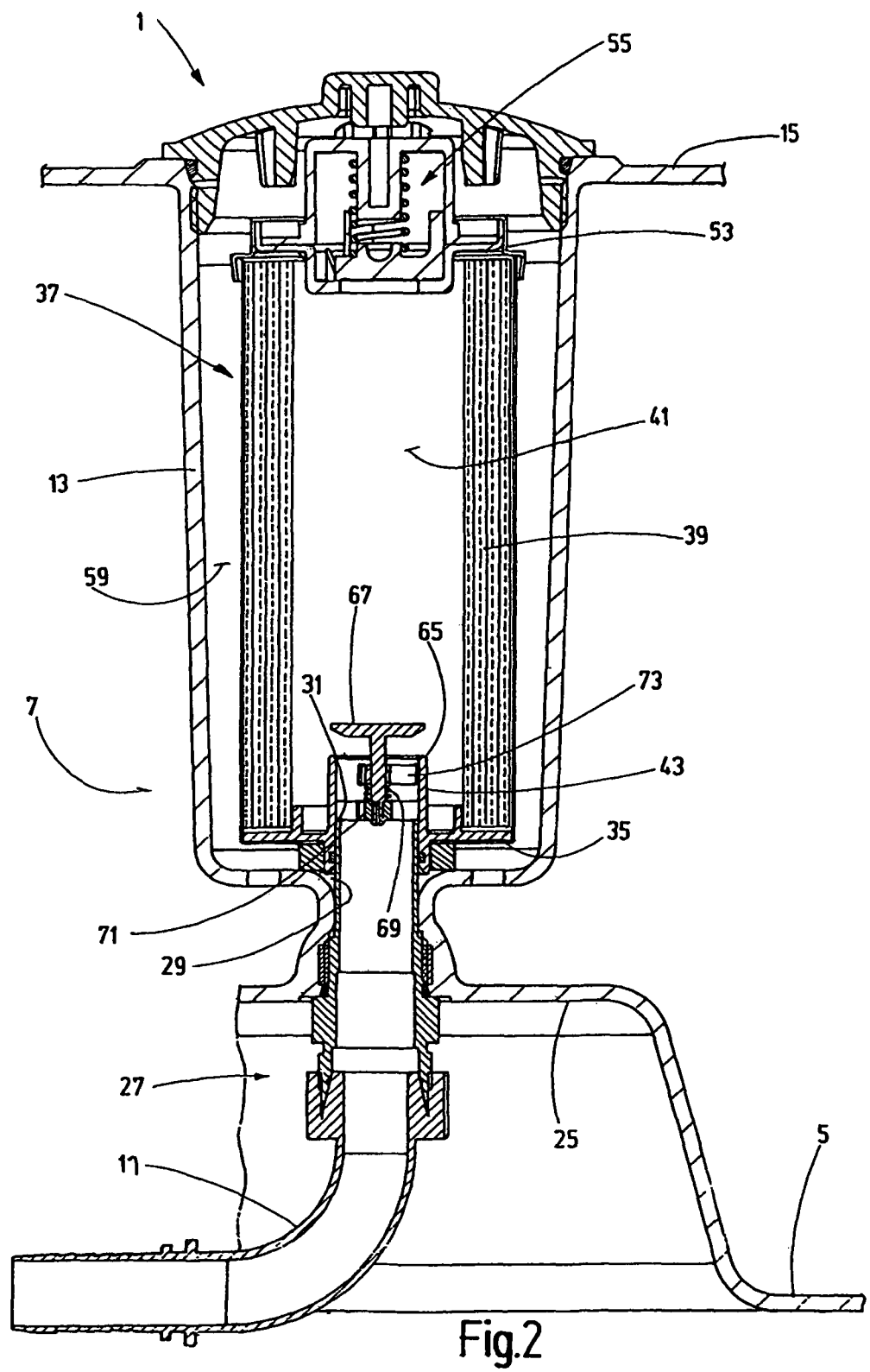
FIG. 2 is a side elevational view in section of a fluid tank with a filter device according to a second exemplary embodiment of the invention.

The exemplary embodiment shown in FIG. 2 differs from the first exemplary embodiment only by the construction of the valve arrangement on the inlet fitting 43 of the end cap 35. In this exemplary embodiment, the inlet fitting 43 is extended into the interior of the filter cavity 41. The free end 65 of the inlet fitting 43 is then located above the end 31 of the connection fitting 29. With its free end 65, the inlet fitting 43 forms a valve seat for a disk-shaped valve body 67 of the valve arrangement. In the operating position shown in FIG. 2, the axially movable valve body 67 is raised off the end of the inlet fitting 43 against the action of a closing spring 69 because the connection fitting 29 with its inner end 31 has moved a spring carrier 71 upward, which spring carrier is movably guided within the inlet fitting 43. As a result of this movement, the valve body 67 is moved up and raised off the valve seat, with the closing spring 69 being more strongly compressed between the spring carrier 71 and a second spring carrier 73 located stationary in the inlet fitting 43. If at this point the filter element 37 is pulled off the element receiver and removed from the filter bowl 13 when the element is being changed, the closing spring 69 is only partially released such that the valve body 67 moves onto the valve seat on the end 65 of the inlet fitting 43 and closes the inlet fitting 43. Thus, the second exemplary embodiment works in exactly the same way as in the example of the first embodiment. Since, except for the different design of the valve arrangement, in the two exemplary embodiments, the other components are comparable, not all details which are made the same in the two exemplary embodiments are numbered in FIG. 2.

While various embodiments have been chosen to illustrate the invention, it will be understood by those skilled in the art that various changes and modifications can be made therein without departing from the scope of the invention as defined in the appended claims.

What is claimed is:

1. A filter device, comprising:
   a filter housing including at least one connection unit forming a fluid connection supplying unfiltered fluid to be filtered and having a connection fitting;
   a filter element received in said filter housing and including a filter medium having a clean outer side and a dirty inner side, said inner side being connected in fluid communication to said fluid connection to receive the unfiltered fluid to be passed through said filter element, said inner side defining an inner filter cavity, said filter element having an end cap;
   an element receiver in said filter housing being a component of said connection unit and interacting with said end cap of said filter element in an operating position of said filter element;
   a valve arrangement being a component of said filter element, being located in said filter cavity, being movable from a closed position thereof to an open position thereof by interaction with said connection unit when said filter element is inserted into the operating position and being movable from the open position to the closed position in said filter element upon removing said filter element from the element receiver, said valve arrangement including a valve cap of elastomeric material with notches, said valve cap being on an end of an inlet fitting on said filter element, said connection fitting extending completely through said inlet fitting, engaging said end cap and projecting into said filter cavity in the operating position of said filter element to open said notches of said valve cap forming flow slots by mechanical action of said connection fitting engaging said end cap; and
   a seal connecting said inlet fitting and said connection fitting.

2. A filter device according to claim 1 wherein
   said valve arrangement is openable by said connection unit from the closed position to the open position in succession in relative movement of said filter element toward said filter housing for a start-up operation.

3. A filter device according to claim 1 wherein
   said filter housing comprises a filter bowl integrally molded into a tank and having a bowl bottom, said connection unit being on said bowl bottom.

4. A filter device according to claim 3 wherein
   a connection piece is molded on said bowl bottom, is joined to a bottom-side wall section of said tank and forms a connection passage, said connection fitting extending through said connection passage from outside said tank into said filter bowl.

5. A filter device according to claim 4 wherein
   said bottom-side wall section of said tank is located in a local indentation extending upward from a base of said tank.

6. A filter device according to claim 4 wherein
   said connection fitting is fixed in said connection piece by a screw union.

7. A filter device according to claim 3 wherein
   said tank with said filter bowl are integrally molded together of plastic.

8. A filter device according to claim 3 wherein
   said filter bowl is open on a top of said tank and is closed by a plastic cover threaded on an internal thread in an opening edge region of said filter bowl to form a part of an upper tank wall of said tank.

9. A filter device, comprising:
   a filter housing including at least one connection unit forming a fluid connection supplying unfiltered fluid to be filtered and having a connection fitting;
   a filter element received in said filter housing and including a filter medium having a clean outer side and a dirty inner side, said inner side being connected in fluid communication to said fluid connection to receive the unfiltered fluid to be passed through said filter element, said inner side defining an inner filter cavity, said filter element having an end cap;

an element receiver in said filter housing being a component of said connection unit and interacting with said end cap of said filter element in an operating position of said filter element;

a valve arrangement being a component of said filter element, being located in said filter cavity, being movable from a closed position thereof to an open position thereof by interaction with said connection unit when said filter element is inserted into the operating position and being movable from the open position to the closed position in said filter element upon removing said filter element from the element receiver, said valve arrangement including a movable valve body being on an inlet fitting, being pretensioned by a mechanical closing force into the closed position blocking said inlet fitting and being movable to the open position from the closed position upon said connection fitting engaging said movable valve body by mechanical action of said connection fitting against the closing force.

10. A filter device according to claim 9 wherein said valve arrangement is openable by said connection unit from the closed position to the open position in succession in relative movement of said filter element toward said filter housing for a start-up operation.

11. A filter device according to claim 9 wherein said filter housing comprises a filter bowl integrally molded into a tank and having a bowl bottom, said connection unit being on said bowl bottom.

12. A filter device according to claim 11 wherein a connection piece is molded on said bowl bottom, is joined to a bottom-side wall section of said tank and forms a connection passage, said connection fitting extending through said connection passage from outside said tank into said filter bowl.

13. A filter device according to claim 12 wherein said bottom-side wall section of said tank is located in a local indentation extending upward from a base of said tank.

14. A filter device according to claim 12 wherein said connection fitting is fixed in said connection piece by a screw union.

15. A filter device according to claim 11 wherein said tank with said filter bowl are integrally molded together of plastic.

16. A filter device according to claim 11 wherein said filter bowl is open on a top of said tank and is closed by a plastic cover threaded on an internal thread in an opening edge region of said filter bowl to form a part of an upper tank wall of said tank.

17. A valve device according to claim 9 wherein said inlet fitting is fixedly mounted in said filter element, extends into said inner filter cavity, has a valve seat on a free end of said inlet fitting and has first and second spring carriers extending radially inwardly from an inner surface of said inlet fitting and being axially spaced; and said movable valve body having a valve stem slidably received in said spring carriers and having a valve plate on an end of said valve stem movable relative to said valve seat between the open and closed positions.

18. A valve device according to claim 17 wherein a spring extends between said first and second carriers and biases said valve plate into engagement with said valve seat.

* * * * *